US007203943B2

(12) United States Patent
Shaffer

(10) Patent No.: US 7,203,943 B2
(45) Date of Patent: Apr. 10, 2007

(54) DYNAMIC ALLOCATION OF PROCESSING TASKS USING VARIABLE PERFORMANCE HARDWARE PLATFORMS

(75) Inventor: Larry J. Shaffer, Thornton, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 682 days.

(21) Appl. No.: 10/002,073

(22) Filed: Oct. 31, 2001

(65) Prior Publication Data

US 2003/0084088 A1    May 1, 2003

(51) Int. Cl.
*G06F 9/46*    (2006.01)
*G06F 15/173*   (2006.01)

(52) U.S. Cl. ...................... 718/104; 709/226
(58) Field of Classification Search ............... 370/431; 709/105, 224–226; 718/105, 104
See application file for complete search history.

(56) References Cited

U.S. PATENT DOCUMENTS

| | | | | |
|---|---|---|---|---|
| 4,972,314 A | | 11/1990 | Getzinger et al. ........... 364/200 |
| 5,210,872 A | | 5/1993 | Ferguson et al. ............ 395/650 |
| 5,798,667 A | | 8/1998 | Herbert ...................... 327/513 |
| 5,838,968 A | | 11/1998 | Culbert ....................... 395/674 |
| 5,925,092 A | * | 7/1999 | Swan et al. ................. 701/226 |
| 5,978,831 A | | 11/1999 | Ahamed et al. ............ 709/105 |
| 6,104,721 A | * | 8/2000 | Hsu ............................ 370/431 |
| 6,173,306 B1 | | 1/2001 | Raz et al. ................... 709/102 |
| 6,298,448 B1 | | 10/2001 | Shaffer et al. .............. 713/322 |
| 6,314,447 B1 | * | 11/2001 | Lea et al. ................... 718/105 |
| 6,484,265 B2 | * | 11/2002 | Borkar et al. .............. 713/324 |
| 6,862,623 B1 | * | 3/2005 | Odhner et al. .............. 709/226 |

\* cited by examiner

*Primary Examiner*—Meng-Al T. An
*Assistant Examiner*—Camquy Truong
(74) *Attorney, Agent, or Firm*—Sheridan Ross P.C.

(57) ABSTRACT

The present invention provides for the dynamic allocation of processing tasks using variable performance hardware. In addition, the present invention allows tasks to be assigned to computer resources according to the ability of a computer resource to perform the task. In particular, in accordance with an embodiment of the present invention, a computer resource may reject a task of a type that is incompatible with the computer resource or that cannot be performed by the resource in a timely manner. The task may then be assigned to another computer resource. In accordance with a further embodiment of the present invention, a table containing information concerning the available capabilities of computer resources associated with a system is maintained. This table may be updated dynamically, as computer resource capabilities change. Tasks may then be assigned with reference to the table to ensure that only computer resources capable of performing a task in a timely manner are assigned that task. The present invention allows computer resources having differing, including variable, performance characteristics to be integrated into a computer system and allows these resources to be dynamically added and removed.

27 Claims, 5 Drawing Sheets

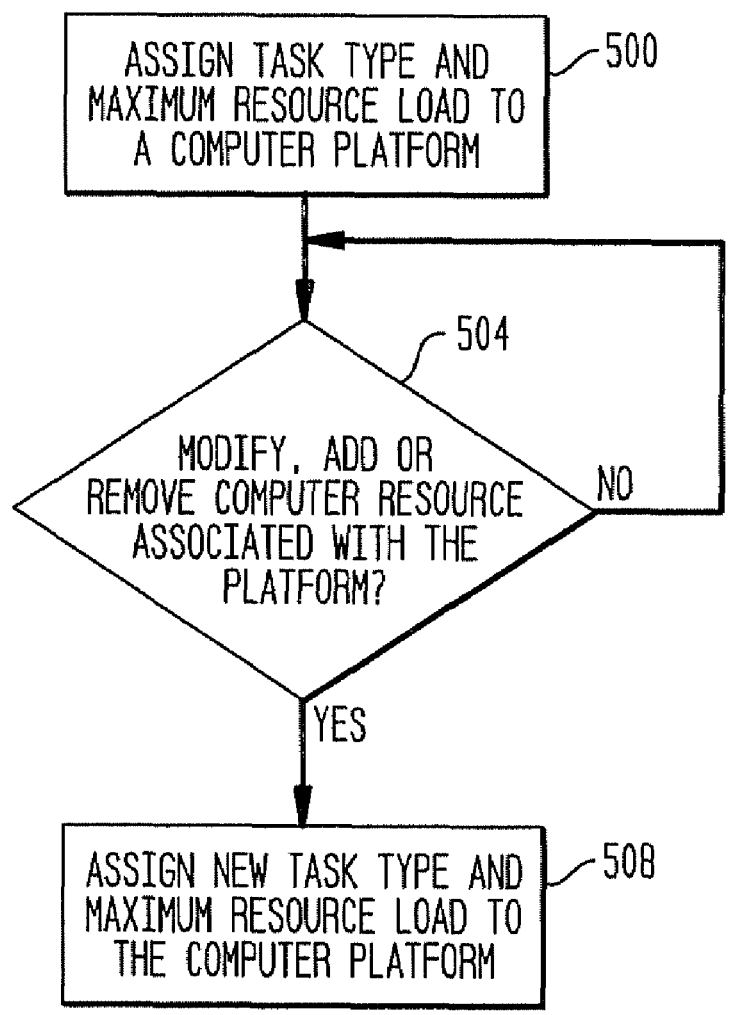

DYNAMIC ALLOCATION OF PROCESSING TASKS USING VARIABLE PERFORMANCE HARDWARE PLATFORMS

FIELD OF THE INVENTION

The present invention relates to the dynamic allocation of processing tasks in computer systems.

BACKGROUND OF THE INVENTION

Computer systems are used in connection with a wide variety of applications. In addition, computer systems generally include a variety of resources, including processors, memory, input/output channels, etc., that can be used in connection with the performance of various tasks. Furthermore, computer systems may include multiple instances of a particular type of computer resource, or various combinations or resource types. In order to ensure the efficient operation of a computer system, it is important to allocate tasks among the various computer resources in a way that ensures the timely completion of the assigned task.

In a computer system that supports symmetrical multiprocessing, any task requiring processing can be assigned to any processor. A symmetrical multiprocessing system requires software applications that are multi-threaded. In addition, the successful operation of a symmetrical multiprocessing system often requires that all of the processors present in the system run at the same frequency and have the same performance characteristics. Accordingly, such a system typically cannot be expanded by, for example, adding a processor operating at a frequency that is different from the processor or processors already present in the system.

Another example of an existing computer system capable of assigning tasks among various computer resources relies on a hierarchy of processors. According to such a system, tasks are assigned by a central processor, which handles all software interrupts. The central processor assigns tasks to those resources best able to complete them. For example, in a hierarchal system, a task requiring the manipulation of numerical values may be assigned to a co-processor that is especially adapted to floating point operations. In a typical hierarchical system, the resources that may be used in connection with the system are limited to specialized hardware that is uniquely adapted for use in connection with existing hardware and software. Therefore, the type and number of resources that can be added to a hierarchal system are severely limited.

The expansion or modification of computer system capabilities is useful in a variety of applications. For example, the ability to expand the capabilities of a computer system is useful in connection with meeting the needs of a growing business. Likewise, computer resources that can be easily removed from a computing system, for example for reallocation in connection with another system, without requiring substantial revisions to the original system, are desirable. However, existing computing systems require that software used in connection with the system be reconfigured or modified in response to changes in available resources, to enable the system to adapt to changes in available resources. The reconfiguration or modification of software may include the resetting of software switches, or even the rewriting of software code. The need for changes in system software to allow systems to operate with different hardware resources make modifications to hardware resources associated with computer systems cumbersome and expensive. In addition, existing systems have been incapable of dynamically adapting to alterations in available resources. In particular, existing systems have been incapable of adapting to hardware resources having variable performance characteristics.

An example of a computer system in which the convenient expansion of computer resources is desirable is a telephone call processing system. In existing call processing systems, expansion is possible by interconnecting carriers containing additional processors or other hardware resources to the system. However, each processor or other resource must have performance characteristics matched to the resources already installed in the system. This is because the operating software is incapable of recognizing differences in the performance of hardware resources (for example, processors) interconnected to the system. Therefore, a system designed for use with a processor operating at a first speed could not efficiently use the additional processing capability of a processor operating at a second, higher speed.

SUMMARY OF THE INVENTION

The present invention is directed to solving these and other problems and disadvantages of the prior art. Generally, according to the present invention, tasks are assigned point values reflecting the amount of computer resources their completion will require. Tasks may also be categorized by type. Computer resources associated with a system are assigned point values reflecting their ability to provide a quantity of computer resources. The computer resources may also be categorized by the type of tasks that they can perform.

In accordance with an embodiment of the present invention, tasks may be assigned to a computer resource, and that resource may accept or reject the task based on the resource's capabilities. If the task is accepted, the resource proceeds to complete the task. If the task is not accepted, the task is assigned to another computer resource.

In accordance with another embodiment of the present invention, each computer resource provides an indication of its capabilities to a table. Entries in the table for each resource may indicate the type of tasks that a resource is capable of performing, the current computer resource load assigned to the resource, and the maximum computing resource amount that can be assigned to the resource. According to such an embodiment, reference is made to the table before a task is assigned to a computer resource. In particular, a task is assigned to a resource capable of handling that task type, and capable of providing the required resources.

In accordance with a further embodiment of the present invention, the capability of a computer resource may be dynamically adjusted. In connection with such an embodiment, the maximum amount of computer resources that can be provided by a particular resource may be updated each time the capabilities of that resource are dynamically adjusted. For example, an entry in a table of computer resources associated with the system may be updated to reflect a new maximum computer resource load that can be assigned to a computer resource after the performance of that resource has been dynamically adjusted.

According to yet another embodiment of the present invention, computer resources of different types and capabilities may be associated with the same system. Furthermore, the capabilities of such resources may be reported to the system periodically or when information regarding available resources is required. As an alternative or in addition, the capabilities of a particular computer resource may be reported to the system when the resource is connected to the system, when the resource is disconnected from the system, when the system is powered up, or when the system is powered down.

These and other advantages and features of the invention will become more apparent from the following discussion, particularly when taken together with the accompanying drawings.

BRIEF DESCRIPTION OF THE DRAWINGS

FIG. 5 is a flow chart illustrating varying the performance of a computer resource associated with a computer system in accordance with another embodiment of the present invention.

DETAILED DESCRIPTION

Figure 1:
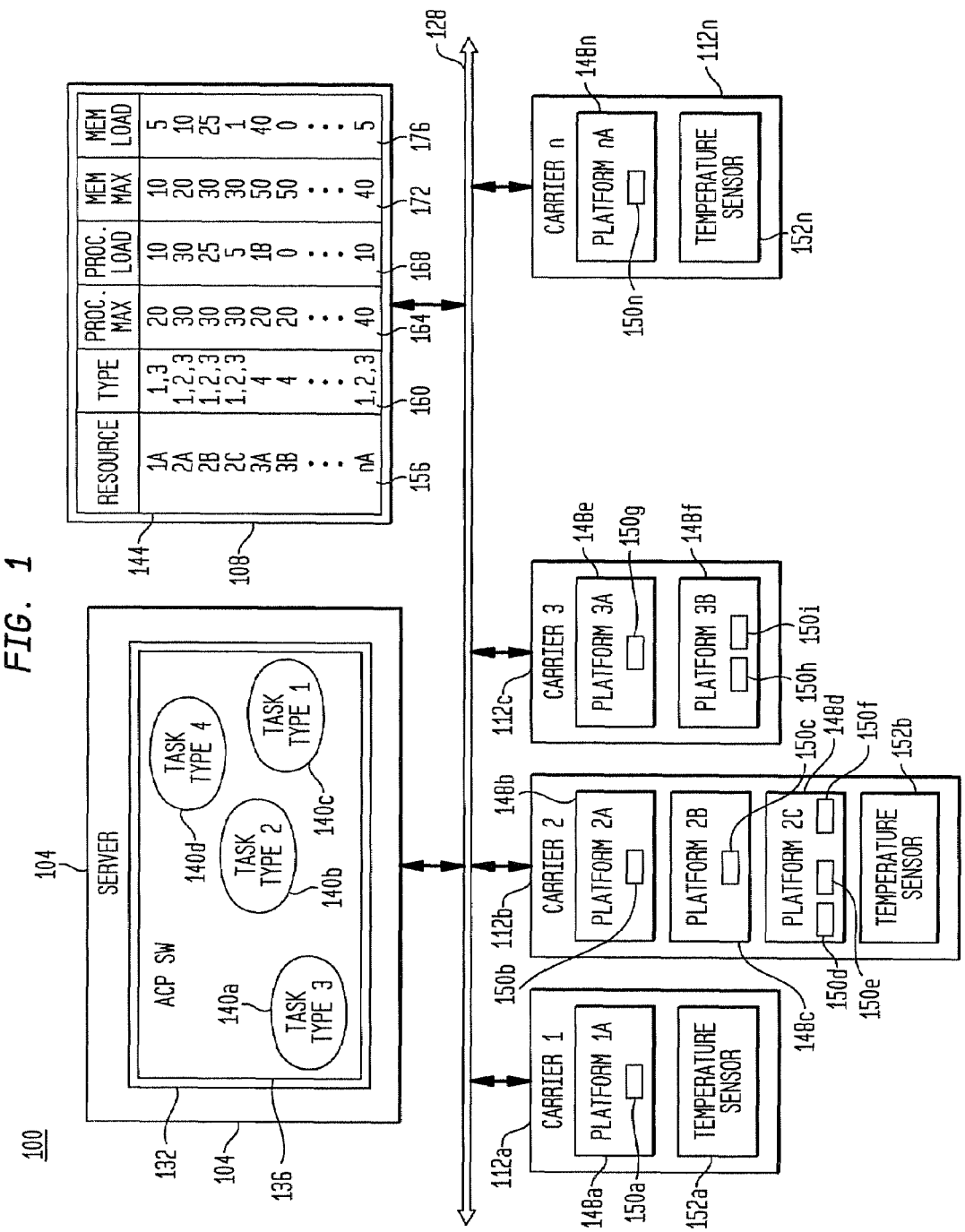
FIG. 1 is a block diagram depicting a computer system in accordance with an embodiment of the present invention.

With reference now to FIG. 1, a computer system 100 in accordance with an embodiment of the present invention is illustrated in block diagram form. In general, the computer system 100 includes a server 104, memory 108, and a number of carriers 112. A computer network 128 may be provided to interconnect the various components of the computer system 100.

The server 104 generally includes a processor 132 running system or processing software 136. The system software 136 may generate and/or handle a variety of tasks 140. For example, when the system 100 is used in connection with a telephone call processing center, the system software 136 may comprise automatic call processing (ACP) software, and the tasks 140 generated in connection with or handled by the system software 136 may include dual tone multiple frequency (DTMF) reception 140a, tone generation 140b, and call progress tone detection 140c tasks.

The memory 108 may be any device capable of storing computer data, including but not limited to solid state memory and disk drives. The memory 108 may be used to store various data used in connection with the operation of the system 100. In accordance with an embodiment of the present invention, the memory 108 is used to store a table 144 containing data related to the capabilities and current resource loads assigned to the computer platforms 148. Accordingly, a first column 156 may identify each computer platform 148 associated with the system, a second column 160 may contain task type codes for each computer platform 148, a third column 164 may contain a maximum resource load value (or resource amount capability), such as a processor load value, and a fourth column 168 may contain a current assigned resource load value, such as a current assigned processor load value. Alternatively or in addition, a column may be provided for tabulating the resource load, given as the difference between the maximum resource load value and the current assigned resource load value, that each computer platform 148 can accommodate.

The table 144 may also include a fifth column 172 containing a maximum memory load value, and a sixth column 176 that may contain a current assigned memory load value. Alternatively or in addition, a column may be provided for tabulating the memory load, given as the difference between the maximum memory load value and the current assigned memory load value, that each computer platform 148 can accommodate.

The carriers 112 may be adapted to perform various functions. In addition, carrier 1 112a, carrier 2 112b, carrier 3 112c, and carrier n 112n may each contain one or more computer platforms 148. Each computer platform 148 may comprise one or more computer resources 150. The computer resources 150 may comprise any type of computer resource, including processors, input/output ports, memory, and communication bandwidth, and each resource may be different from one another. In addition, each computer platform 148 may include ancillary computer resources. For example, a computer platform 148 intended to provide processing capabilities may include one or more processing resources 150, in the form of computer processors, and may also include memory resources 150 to facilitate the performance of tasks 160 requiring processing. As still another example, a computer platform 148 intended to provide input/output capabilities may include an input/output port resource 150, a processor resource 150 for data flow control, and a memory resource 150 for the buffering and/or caching of data.

A temperature sensor 152 may be associated with all or certain of the carriers. For example, a temperature sensor 152a is associated with carrier 1 112a, a temperature sensor 152b is associated with carrier 2 112b, and a temperature sensor 152n is associated with carrier n 112n. The temperature sensors 152 may be used to monitor the internal temperature of the associated carrier 112. The temperature data may in turn be used to determine whether adjustments to the performance of a computer platform 148, and in particular to the performance of a computer resource 150 associated with the platform 148 should be made. For example, if the temperature of a carrier 112 is below a first predetermined threshold, a performance related parameter of a computer resource 150 in that carrier 112 can be increased. If the temperature of a carrier 112 is above a second predetermined threshold, a performance related parameter of a computer resource 150 in that carrier can be decreased. This can prevent the internal temperature of the carrier 112 from reaching a level that exceeds the maximum operating temperature of components within the carrier 112, such as a computer resource 150.

The computer network 128 may serve to interconnect the various components of the system 100. The computer network 128 may be any network or communications link 128 capable of carrying digital data. For example, the computer network 128 may comprise an ethernet network; a switched circuit network, such as the public switched telephone network (PSTN); an Internet protocol (IP) network, including a private intranet or the public Internet; and proprietary signal busses. In addition, the computer network 128 may comprise a combination of different network types.

Figure 2:
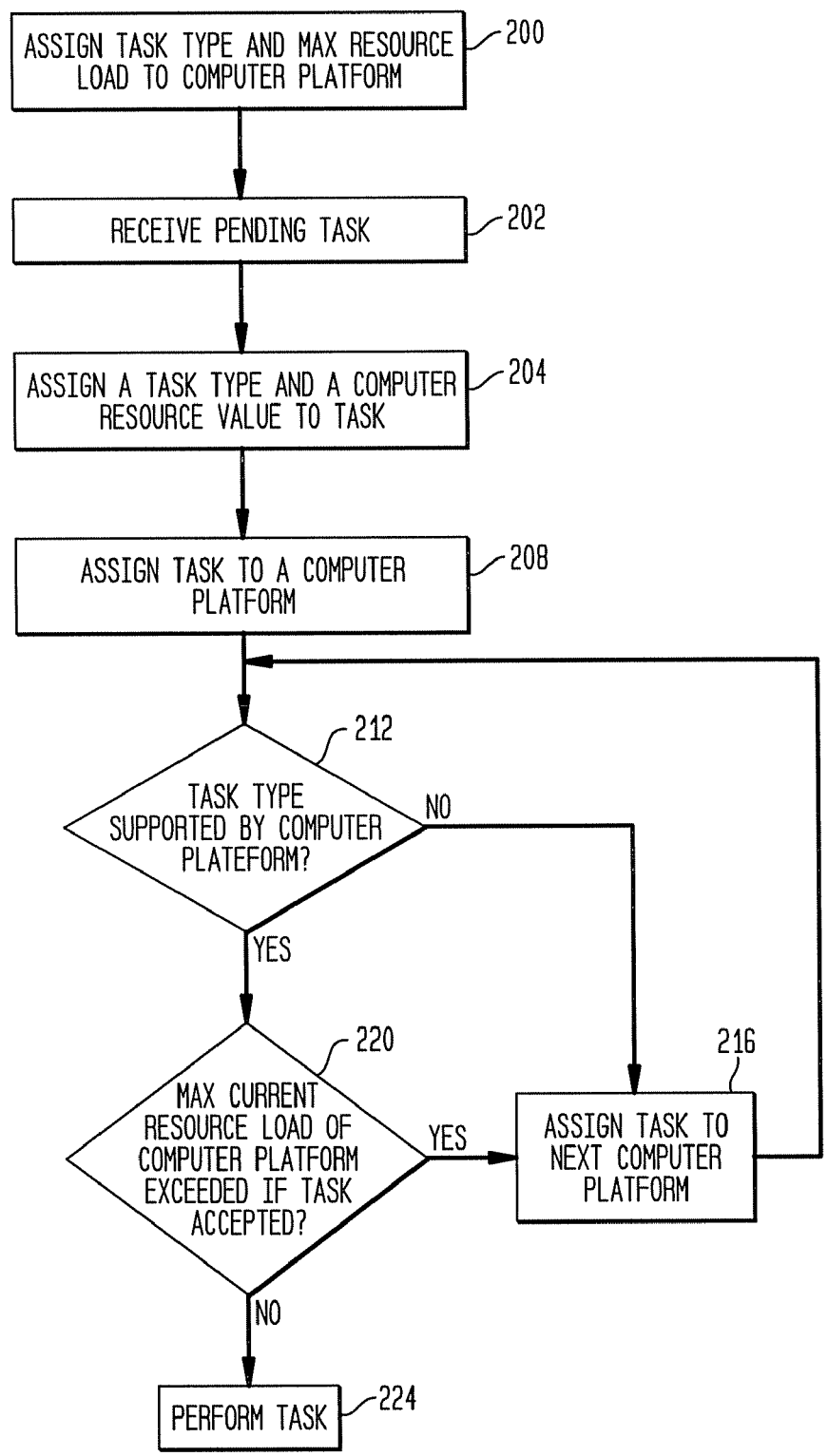
FIG. 2 is a flow chart illustrating the assignment of a task to a computer resource in connection with an embodiment of the present invention.

With reference now to FIG. 2, the operation of a computer system 100 in accordance with an embodiment of the present invention is illustrated. Initially, at step 200, a task type and a maximum resource load are assigned to a computer platform 148. If a number of computer platforms 148 are associated with the system 100, a task type, a maximum processor resource load, and/or a maximum memory resource load may be assigned to each such platform 148. The particular task type, maximum processor resource load, and/or maximum memory resource load assigned to a computer platform 148 is dependent on the capabilities of the computer platform 148. For example, a computer platform 148 that includes a relatively fast processor resource 150 may be capable of performing a large variety of processing tasks, and may support a relatively high load of such tasks. A computer platform 148 that includes a relatively slow processor resource 150 may also be capable of performing a variety of processing tasks, but may support only a relatively small load of such tasks. In addition, a computer platform 148 having a relatively slow processor resource 150 may be incapable of performing processing tasks requiring a large amount of resources. This may be because some tasks are assigned a task classification that is not supported by certain computer resources, for example by the slower processor resource 150, or because the amount of resources required by such a task exceeds the maximum resource load of the slower processor resource 150.

In general, the maximum resource load that can be assigned to a computer platform 148 is determined by some measure of the performance of a resource or resources 150 associated with that computer platform 148. For example, a processor resource's 150 performance may be measured by processing power expressed, for example, in terms of millions of instructions per second (MIPS). As a further example, a memory resource 150 may have its performance measured by capacity and speed parameters. As still a further example, an input/output port resource 150 may have its performance measured in terms of bandwidth and, for example, expressed in terms of megabits per second. The maximum resource load that can be assigned to a computer platform 148 may be represented by a point value. For example, a computer platform 148 having a 32 bit processor resource 150 running at a frequency of 500 MHZ may be assigned a point value 50, representing the ability of the processor resource 150 to perform 500 MIPS. A computer platform 148 having a 32 bit superscalar processor resource 150 running at a frequency of 500 MHz may be assigned a point value 100, representing the ability of the processor resource 150 to perform 1000 MIPS. A computer platform 148 having a data port resource 150 may be capable of performing tasks involving the transfer of data to or from the system 100, and the maximum resource load of the computer platform 148 would depend on the bandwidth of the data port resource 150.

Next, a pending task is received or generated (step 202). For example, in connection with a system 100 concerned with automated call processing, the task may be any one of a number of types, including DTMF reception 140*a*, tone generation 140*b*, and call progress tone detection 140*c*. At step 204, a task type and a computer resource value is assigned to each task. For example, a call progress tone detection task 140*c* may be assigned type 1, a tone generation task 140*b* may be assigned type 2, and a DTMF reception task 140*a* may be assigned type 3. The categorization of tasks 140 into types allows individual tasks 140 to be assigned to a computer platform 148 according to the ability of a resource or resources 148 associated with the computer platform 148 to perform that type of task 140.

In addition, a computer resource value is associated with the task 140. The computer resource value is a measure or indication of the amount of hardware resources 150 required for performance of the task 140. As noted above, the computer resource value may be represented by a point value. For example, a task requiring a greater amount of processing time on a processor resource 150 running at a specified number of instructions per unit time may be assigned a greater point value than another task requiring a lesser amount of time on an identical processor resource 150. As a further example, the computer resource value of a task 140 may be characterized by a data transfer rate or amount of memory required to complete the task 140 in a specified amount of time. The task type and computer resource value may be assigned to a task 140 when that task 140 is generated or received by the system software 136. Alternatively, a task type and computer resource value may already be associated with the task 140, and may be included, for example, in header information concerning the task 140.

The task 140 is then assigned to a computer platform 148 (step 208). For example, the task 140 may be provided to a computer platform 148 over the network 128. The computer platform 148 may then determine whether the task type is one that is supported by that computer platform 148 (step 212). If the task type is not supported, the computer platform 148 rejects the task 140, and the system software 136 assigns the task 140 to a next computer platform 148 (step 216).

If the task type is supported, the computer platform 148 determines whether the current resource load of that computer platform 148 would be exceeded if the task 140 is accepted (step 220). If the maximum resource load of the computer platform 148 would be exceeded by accepting the task 140, the computer platform 148 rejects the task 140, and the system software 136 assigns the task 140 to a next computer platform 148 (step 216). If the maximum resource load of the computer platform 148 would not be exceeded by accepting the task 140, the computer platform 148 performs the task 140 (step 224).

From the above description, it can be appreciated that each computer platform 148 may perform a screening function to ensure that assigned tasks 140 can be completed, and that the tasks 140 can be completed in a timely fashion. If the computer platform 148 is incapable of performing a particular task 140, the task 140 is rejected. In addition, a task 140 may be rejected by a computer platform 148 if that task 140 is too large to be handled by the computer platform 148, or cannot be handled by the computer platform 148 in a timely fashion. For instance, if tasks 140 are already queued for performance in connection with a computer platform 148, an additional task 140 will be rejected if acceptance of that task 140 would cause the resource load assigned to the computer platform 148 to exceed the specified maximum value. Therefore, it can be appreciated that the computer platforms 148 associated with a computer system 100 determine whether a task 140 is accepted. Furthermore, it can be appreciated that the computer platforms 148 associated with a computer system 100 can be altered without requiring the processing software 136 associated with the server 104 to be modified. In particular, the computer system 100 need only be notified of the presence or absence of a computer platform 148. The particular capabilities of that computer platform 148, and in particular the ability of that computer platform 148 to handle a particular task 140, can be determined by the computer platform 148 itself. Therefore, a computer system 100 operating in accordance with the embodiment of the present invention illustrated in FIG. 2 does not require a table 144. In addition to allowing and facilitating the reconfiguration of the computer system 100, the present invention allows individual computer platforms 148 to adapt variable performance characteristics.

Figure 3:
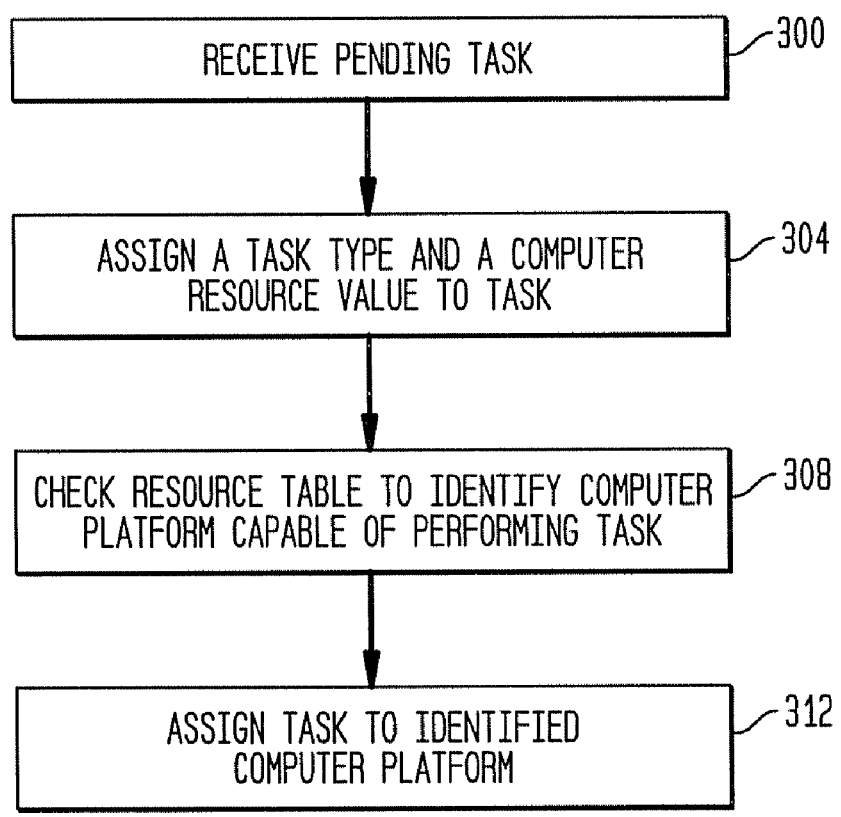
FIG. 3 is a flow chart illustrating the assignment of a task to a computer resource in accordance with another embodiment of the present invention.

In FIG. 3, the operation of a system 100 in accordance with yet another embodiment of the present invention is illustrated. Initially, at step 300, a pending task 140 is received by or generated in connection with the system software 136. At step 304, a task type and a computer resource value is assigned to the task 140. The resource table 144 is then checked to identify a computer platform 148 capable of performing the task 140 (step 308).

With reference to the example table illustrated in FIG. 1, and in particular to the task type code column 160, a task 140 assigned type 1, for example, a call progress tone detection task 140c, can be performed on computer platforms 1A 148a, 2A 148b, 2B 148c, 2C 148d, and nA 148n of the example system 100. A task 140, assigned type 2, for example as tone generation 140b task, may be performed on computer platform 2A 148b, 2B 148c, 2C 148d, and nA 148n. A task 140, assigned type 3, for example a DTMF task 140a, may be performed on computer platforms 1A 148a, 2A 148b, 2B 148c, 2C 148d, and nA 148n. A task 140 having an assigned type 4, for example a data transfer operation task 140d, may be performed in connection with computer platform 3A 148e and 3B 148f. The various abilities of the computer platforms 148 may be due to the type or capability of the resource or resources 150 associated with the different computer platforms 148. For instance, carrier 1 112a, carrier 2 112b, and carrier n 112n may each include computer resources 150 that comprise relatively powerful computer processors. Furthermore, each of those computer processors 150 may be capable of performing a task 140 that is relatively small. However, only the platforms 148 associated with carrier 2 112b and carrier n 112n may be capable of performing a relatively processor intensive task 140. In general, a processor type computer resource 150 must have a relatively large maximum resource load value in order to complete a relatively large task in a timely fashion. For example, if a tone generation task 140b is assigned a resource load value of 25, reference to the example maximum resource load for the various computer platforms 148 in the third column 164 of the table 144 shows that only computer platforms 2A 148b, 2B 148c, 2C 148d and nA 148n have maximum resource load values large enough to handle a type 2 task 140 with a resource requirement value of 25. Also, in the example of FIG. 1, with reference to the example current assigned resource load value column 168, only computer platform 2C 148d is capable of accepting a task with a resource requirement value of 25 without exceeding its maximum load value of 30. Therefore, in the present example, a task 140 having a value of 25 could be assigned only to computer platform 2C 148d. If there were no computer platforms 148 capable of performing a pending task 140, the processing software 136 can hold that task 140 until a suitable computer platform 148 is available. If no suitable computer platform 148 becomes available within a predetermined period of time, the system 100 may reject the task. In the example of FIG. 1, all of the processor platforms adapted for providing processing resources 148, (i.e. the platforms 148 included in carriers 1 112a, 2 112b and n 112n) are capable of performing type one tasks 140. However, it should be noted that such tasks 140 do require access to memory resources (e.g., memory 108) for their performance. Therefore, the table 144 may, by including a maximum memory resource load 172 and current memory resource load 176, allow tasks 140 to be allocated only to computer platforms 148 that not only have suitable processing resource capabilities, but that also have suitable memory resource capabilities.

Returning to FIG. 3, at step 312, the task 140 is assigned to a computer platform 148 identified as being capable of performing the type of task 140, and having sufficient available computer resources value.

Figure 4:
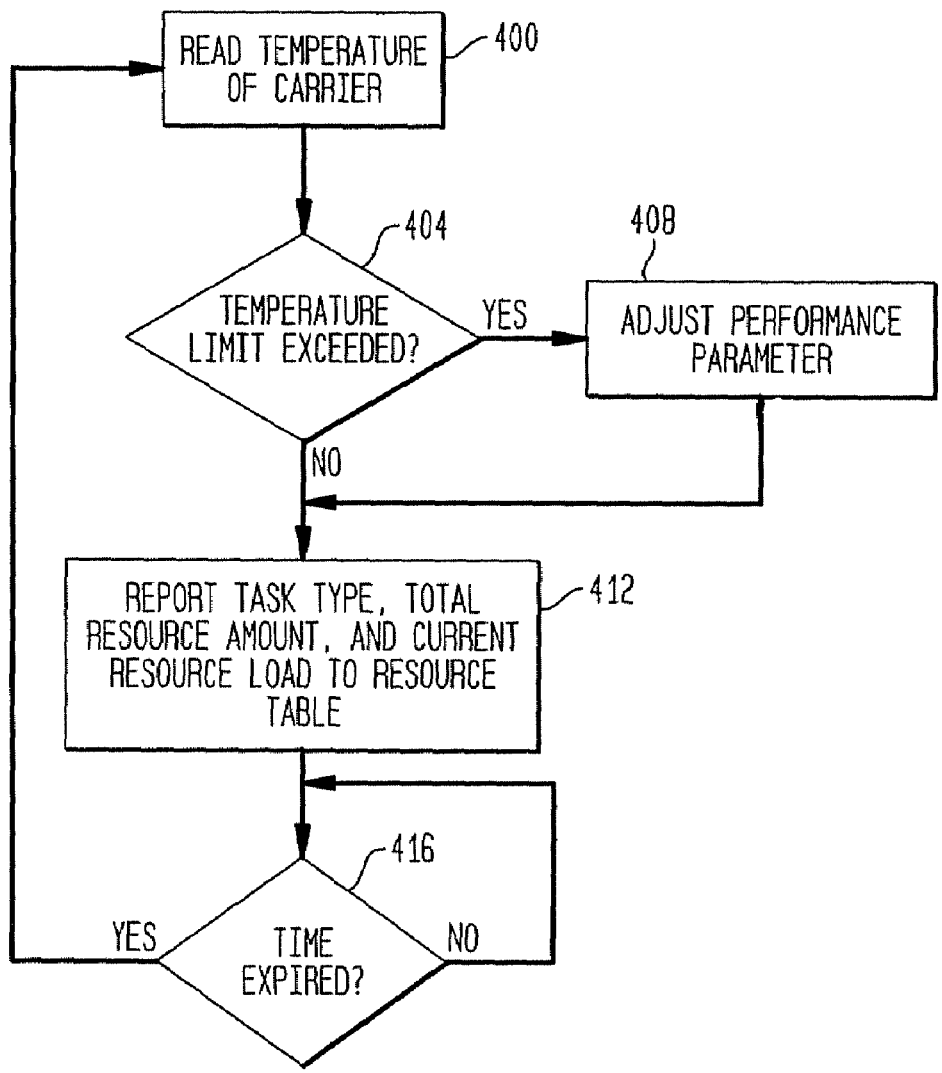
FIG. 4 is a flow chart illustrating varying the performance of a computer resource associated with a computer system in accordance with an embodiment of the present invention.

With reference now to FIG. 4, the entry of information in a table 144 in accordance with an embodiment of the present invention is illustrated. As noted above, certain of the carriers 112 associated with the system 100 may include temperature sensors 152. At step 400, the temperature of a carrier (e.g., carrier 1 112a) is read. At step 404, a determination is made as to whether a temperature limit associated with the carrier 112a is exceeded. If the temperature limit has been exceeded, a performance parameter of one or more computer platforms 148 (in the present example, platform 148a) associated with the carrier 112a is adjusted (step 408). For example, as can be appreciated, the number of instructions per unit time that a processor type resource 150 is capable of performing can be varied by varying the clock rate at which such a computer resource 150 operates. In addition, an increase in clock rate may require a corresponding increase in the voltage supplied to such a computer resource 150. However, increases in either the clock rate or operating voltage can increase power consumption, and therefore the amount of heat generated by the computer resource 150. In order to provide maximum performance capabilities, a computer resource 150 is typically operated at the highest clock speed and/or voltage level that can be sustained without causing the temperature of that computer resource 150, computer platform 148, and/or carrier 112 to exceed a predetermined limit. Where several computer platforms 148 are associated with a common enclosure or carrier (e.g., carrier 2 112b, which includes three computer platforms 148b, 148c, and 148d), the heat generated by one computer resource 150 may affect all of the platforms 148 and resources 150 in the carrier 112. As a result, conventional systems have typically operated computer resources 150 at conservative levels, to ensure that temperature limits are not exceeded in worst case situations.

By allowing the performance characteristics of a computer platform 148, and in particular a computer resource 150 to be adjusted depending on the current conditions (e.g., temperature), the performance of a system 100 can be maximized. For example, a system 100 may be capable of safely offering increased performance in the evening, when heat in the environment surrounding the system 100 is lower, while decreasing that performance in the daylight hours, when heat load from the sun may be a factor, without compromising the reliability of the system 100.

In order to enable the system 100 to take advantage of or adapt to changes in the performance of associated computer platforms 148, each computer platform 148 reports its current task type capability, maximum resource amount, and current resource load to the resource table 144 periodically (step 412). This updating of the resources table 144 may occur whether or not the performance parameters associated with a computer platform 148 have been altered. For example, such a report or update may be made each time the temperature of a carrier 112a, 112b, 112c and 112n is read. At step 416, a determination is made as to whether a timer has expired, in which case the temperature is read and the table entry updated.

In addition to altering the clock speed and/or voltage of a computer resource 150, other methods of controlling the power consumption, and therefore the heat output, of a computer resource, such as instruction throttling, may be used. For example, the rate at which instructions are provided to a processor type resource 150 associated with a computer platform 148 can be regulated. In particular, instructions may be provided at a faster rate if the temperature in the carrier 112 is below a first predetermined level, and may be decreased if the temperature in the carrier 112 is above a second predetermined level. The use of instruction throttling to control the heat generation in a carrier 112 results in a computer platform 148 having variable performance. Therefore, the present invention can be used in connection with instruction throttling to ensure that computer platforms 148 are used efficiently.

As can be appreciated by one of ordinary skill in the art, the present invention is not limited to use in connection with systems 100 in which the performance of computer platforms 148 are dynamically adjusted (i.e. adjusted while the system 100 is in operation). For example, the present invention may be used in connection with changes in the number or type of computer platforms 148 associated with the system, or with changes in the number or type of computer resources 150 associated with a computer platform 148. In particular, the present invention allows computer resources 150 to be added, removed or modified, without requiring modifications to the system software 136, while allowing for the efficient usage of those computer resources 150. In addition, the present invention allows computer resources 150 of differing capabilities to be integrated into a system 100 or used with system software 136 without requiring changes to the system software 136 itself to reflect the changes in hardware (i.e. in the computer resources 150).

With reference now to FIG. 5, the modification of a task type and resource load associated with a computer platform 148 according to a further embodiment of the present invention is illustrated. Initially, at step 500, a task type and maximum resource load is assigned to a computer platform 148. In general, the task type and resource load for a particular computer platform 148 depends upon the computer resources 150 associated with that computer platform 148. At step 504, a determination is made as to whether a computer resource 150 associated with the platform 148 has been modified, added or removed. If no such change has occurred with respect to the computer platform 148, the system idles at step 504. If a computer resource 150 has been modified, added or removed with respect to the computer platform 148, a new task type and maximum resource load is assigned to the computer platform (step 508). By assigning and updating task type and resource load capability, the system 100 may be informed of the changed capabilities of a computer platform 148 dynamically.

In connection with a system 100 in which tasks 140 are assigned to computer platforms 148, and the computer platform 148 determines whether it can complete the task, the step 508 of assigning a new task type and maximum resource load comprises keeping a record of the new task type and resource load in the computer platform 148 itself. In a system 100 utilizing a table 144, the step 508 of assigning a new task type maximum resource load comprises reporting an updated task type and/or an updated resource load capability to the memory 108 for inclusion in the table 144.

The present invention allows a system 100 to efficiently utilize the resources 150 available to the system. In particular, the present invention allows computer platforms 148 to be modified, added or removed. Such alterations to computer resources 150 associated with the system 100 can be made, without requiring alterations to the system software 136. In addition, it allows computer resources 150 of different types and capabilities to be used in connection with the system.

Although the present invention has been described in connection with a computer system adapted for telephone call processing, the invention is not so limited. Accordingly, the present invention is suitable for use in connection with any computer system in which it is desirable to accommodate and to efficiently employ computer resources of differing performance characteristics, or computer resources with performance characteristics that can be varied while the system is in operation. In addition, although separate carriers are discussed, they are not necessary. For example, all of the components of a system in accordance with the present invention may be contained in a single enclosure. Furthermore, although particular reasons for and methods of varying the performance of computer resources associated with a system have been discussed, other reasons and methods may be used in accordance with the present invention.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method for dynamically allocating tasks in a computer system, comprising:

dynamically assigning a maximum computer resource load to each of a plurality of computer platforms, wherein a first of said computer platforms has a dynamically assigned first maximum computer resource capability and load and a second of said computer platforms has a dynamically assigned second maximum resource capability and load;

providing a computer resources table, wherein indications of dynamically assigned maximum computer resource capabilities for each of said plurality of computer platforms are maintained;

assigning a computer resource requirement to a task having a processor load value;

referencing said computer resources table for dynamically assigned maximum computer resource capabilities of at least one of said plurality of computer platforms;

assigning said task to the second of said plurality of computer platforms, wherein said processor load value of said task plus said first resource load of said first computer platform is greater than said first dynamically assigned maximum computer resource capability of said first computer platform and said processor load value of said task plus said second resource load of said second computer platform is less than said dynamically assigned second maximum computer resource capability of said second computer platform; and performing said task in connection with said second computer platform.

2. The method of claim 1, wherein said first computer platform load is not equal to said second computer resource load.

3. The method of claim 1, wherein said step of assigning a computer resource requirement comprises assigning a point value to said task.

4. The method of claim 1, wherein each of said plurality of computer resources reports a maximum computer resource load amount to said table prior to said step of assigning a task.

5. The method of claim 1, wherein a task is not assigned to a computer platform if doing so would cause said indication of a computer resource load amount of said computer platform to exceed a maximum computer resource load associated with said computer platform.

6. The method of claim 1, wherein said first computer platform is assigned said task, wherein said maximum computer resource load associated with said first computer platform is exceeded, and wherein said first computer resource rejects said assigned task.

7. The method of claim 6, wherein said task is assigned to said second computer platform after said rejection of said task by said first computer platform.

8. The method of claim 1, further comprising classifying said task by type.

9. The method of claim 8, wherein an indication of a computing resource load and of a task capability for each of said plurality of computer platforms is maintained in said table.

10. The method of claim 9, wherein said task is assigned to a computer platform listed in said computer resources table according to said computing load and said task capability.

11. The method of claim 1, wherein said computer platforms comprise at least one of a processor, an input/output port, an area of memory, and an allocation of bandwidth.

12. The method of claim 1, further comprising:
sensing a temperature of a carrier associated with at least one of said computer platforms;
altering a clock rate of a computer resource associated with a computer platform included in said carrier;
altering a maximum load value of said computer platform, wherein a maximum load value of said computer platform is increased if said clock rate is increased, and wherein a maximum load value of said computer platform is decreased if said clock rate is decreased.

13. The method of claim 1, further comprising:
altering at least one of said plurality of computer platforms, wherein said step of altering comprises at least one of adding, removing, and modifying said at least one computer resource associated with said at least one computer platform.

14. The method of claim 1, wherein at least one of types of tasks that said plurality of computer platforms are capable of performing and current loads assigned to said plurality of computer platforms are maintained in said computer resources table.

15. A method for dynamically allocating computer processor tasks, comprising:
dynamically specifying a first maximum capability of a first computer processor;
dynamically specifying a second maximum capability of a second computer processor;
maintaining a computer processor capability table, wherein dynamically adjusted capability values for said first and second computer processors are stored that are related to said first and second maximum capabilities of said first and second computer processors;
receiving a first task requiring processing, wherein a first processor load value is associated with said first task;
referencing said computer processor capability table to determine that said first processor load value of said first task is greater than said second maximum capability of said second computer processor;
assigning said first task to said first computer processor, wherein said first processor load value is less than said first maximum capability of said first computer processor;
processing said first task using said first computer processor;
receiving a second task requiring processing, wherein a second processor load value is associated with said second task; and
assigning said second task to said second computer processor, wherein said second processor load value of said second task plus a current load value of said first computer processor is greater than said dynamically specified first maximum capability of said first computer processor and said second processor load value of said second task plus a current load value of said second computer processor is less than said dynamically specified second maximum capability of said second computer processor.

16. The method of claim 14, wherein a second capability parameter associated with said first computer processor is stored in said computer processor capability table.

17. The method of claim 14, further comprising specifying a task capability associated with said first computer processor and with said second computer processor, wherein a task of a first task type is assigned to a computer processor having a task capability including said first task type, and wherein a task of a first type is not assigned to a computer resource having a task capability that does not include a task of said first type.

18. The method of claim 15, further comprising:
altering a performance characteristic of said first processor, wherein said step of dynamically specifying comprises respecifying a first capability of said first processor.

19. The method of claim 18, wherein said altered performance characteristic comprises at least one of a frequency of operation, an operating voltage, and a rate of instructions.

20. A computer resource allocation system, comprising:
at least a first computer platform comprising at least a first computer resource and a second computer platform comprising at least a second computer resource, wherein said at least a first computer platform has a first task type capability and a first dynamically specified resource amount capability, wherein said second computer platform has a second task type capability and a second dynamically specified resource amount capability, wherein said first and second task type capabilities do not have to be the same, and wherein said dynamically specified first and second resource amount capabilities do not have to be the same;
processing software running on a server processor, comprising:
memory including a table, wherein said dynamically specified first and second resource amount capabilities of said first and second computer platforms are stored in said table; and
a software task allocation unit, operable to reference dynamically specified resource amount capabilities in said table and further operable to allocate a task having a first processor load value associated therewith to the second computer platform, wherein said first processor load value of said task plus a current load value of said first computer platform is greater than said first dynamically specified resource amount capability of said first computer platform and said first processor load value of said task plus a current load value of said second computer platform is less than said second dynamically specified resource amount capability of said second computer platform.

21. The system of claim 20, wherein an entry for said at least a first computer platform is maintained in said table, and wherein for each such entry a task type capability and a task resource amount are specified.

22. The system of claim 20, wherein said task resource amount is dynamically altered in response to a change in a resource amount capability of said at least a first computer platform.

23. The system of claim 22, wherein said change in a resource amount capability is in response to a substitution of said at least a first computer resource with said second computer resource.

24. The system of claim 22, wherein said change in a resource amount capability is in response to a modification of an operating parameter of said at least a first computer resource.

25. The system of claim 24, wherein said modification of an operating parameter of said at least a first computer resource comprises a modification of at least one of a frequency of operation, an operating voltage, and a rate of instructions.

26. The system of claim 22, further comprising a temperature sensor, wherein said change in a resource amount capability of said at least a first computer resource is made in response to a change in temperature sensed by said temperature sensor.

27. The system of claim 20, wherein said at least a first computer resource comprises at least one of a computer processor, an input/output port, an area of memory, and an allocation of bandwidth.

* * * * *